United States Patent [19]
Yin

[11] Patent Number: 6,028,620
[45] Date of Patent: Feb. 22, 2000

[54] METHOD AND APPARATUS FOR AFFIXING INFORMATION ON OPTICAL STORAGE DISKS

[75] Inventor: Yusong Yin, Stony Brook, N.Y.

[73] Assignee: Photonics Industries Internatinal, Inc., Stony Brook, N.Y.

[21] Appl. No.: 08/762,719

[22] Filed: Dec. 10, 1996

[51] Int. Cl.[7] .................................................. G11B 7/013
[52] U.S. Cl. ........................... 347/252; 347/262; 369/58; 369/44.26; 369/116
[58] Field of Search .................................... 347/252, 262, 347/206; 369/58, 116, 44.26; 219/121.68

[56] References Cited

U.S. PATENT DOCUMENTS

| | | |
|---|---|---|
| 4,066,268 | 1/1978 | Borchard et al. .......................... 274/42 |
| 4,504,548 | 3/1985 | Esho et al. ................................ 428/426 |
| 4,580,146 | 4/1986 | Nakao et al. .......................... 346/135.1 |
| 4,652,498 | 3/1987 | Wolf et al. ............................... 428/461 |
| 4,961,077 | 10/1990 | Wilson . | 
| 5,400,319 | 3/1995 | Fite . |
| 5,430,281 | 7/1995 | Lentz et al. ............................... 235/454 |
| 5,489,768 | 2/1996 | Brownstein et al. ..................... 235/414 |
| 5,513,169 | 4/1996 | Fite . |
| 5,602,814 | 2/1997 | Jaquette et al. ............................ 369/58 |
| 5,837,962 | 11/1998 | Overbeck ............................ 219/121.68 |

Primary Examiner—N. Le
Assistant Examiner—Hai C. Pham
Attorney, Agent, or Firm—James A. Quinton, Esq

[57] ABSTRACT

A method and apparatus for forming machine readable code on an optical information storage disk is provided. The code is formed by periodically pulsing a laser along a path and directing the laser pulse to a preselected point. The laser pulse is adjusted to a preselected spot length and width. A prerecorded optical disk is placed in the path of said laser pulse at said preselected point. The disk is then selectively moved relative to the laser upon each pulse of the laser so that a machine readable mark is made at a different location in the program area of optical information storage disk upon each laser pulse to form a preselected machine readable code.

13 Claims, 5 Drawing Sheets

METHOD AND APPARATUS FOR AFFIXING INFORMATION ON OPTICAL STORAGE DISKS

BACKGROUND OF THE INVENTION

1. Field of the Inventor

This invention relates to optical information storage disks and to an apparatus and a method of forming additional machine readable code on prerecorded disks.

2. Background of the Invention

Optical information storage disks (optical disks) are now a common method of distributing a variety of information products. These disks include CD-audio, CD-ROM, CD interactive and digital video disk (DVD). It is desirable to include machine readable information on the disks in addition to the prerecorded information contained on the disk. Prior art devices and methods have been suggested to provide such information. However, the prior art methods are not sufficiently efficient and do not provide as much additional machine readable information as desired. See U.S. Pat. Nos. 4,961,077 (Wilson); 5,400,319 (Fite); 5,513,169 (Fite).

SUMMARY OF THE INVENTION

The present invention is directed to a method of forming a machine readable code on optical information storage disks, an apparatus for forming machine readable code on optical information storage disks and an optical information storage disk having a plurality of machine readable marks located in any part of the disk which has a reflective metal layer typically aluminum layer. Desirably the marks on the disk are located within program information area and do not interfere with the prerecorded information stored on the disk. Optionally, the marks can be located anywhere on the disk where there is a reflective aluminum layer. A machine for reading such a disk is also provided.

According to the present invention, a method of forming machine readable code on an optical information storage disk such as a CD-ROM or a digital video disk (DVD) is provided. The optical information storage disk has an optical information storage area which contains a prerecorded program area. The optical information storage disk includes a polycarbonate substrate which contains the prerecorded information storage represented by pits in the information storage area and a reflective metal coating typically an aluminum coating applied to the polycarbonate substrate. According to the invention, a laser pulse from a pulsed laser is directed along a predetermined path within the program area of the information storage disk to remove selective portions of the reflective aluminum layer. The pulsed laser is controlled to periodically deliver a laser pulse. A plurality of machine readable marks are formed by the laser corresponding to each laser pulse along a predetermined path. This predetermined path extends circumferentially around the disk to form a machine readable code. According to the invention, it is possible to provide machine readable marks along large portions of the disk. As a result a large amount of machine readable information can be placed on the disk. Generally in optical disks the program information is supplied on circumferential tracks having a preselected radial track separation distance between the tracks. According to the invention, the machine readable marks have a predetermined mark length in the radial direction which is greater than the track separation distance. Desirably the mark length is greater than the concentricity tolerance between the rotating axis of the concentric tracks of prerecorded information and the rotating axis of machine readable code made by laser. Usually the concentricity tolerance is larger than the track separation. The mark has a narrow width in the circumferential direction.

The resulting mark gives a much higher voltage reading from the reading sensor or program code reader then the pits of prerecorded information. As a result the reader can be programmed to have two modes of operation. The recorded mode where the reader is programmed to respond to only the pits and ignore the high voltage producing marks and the security mode where it detects the marks added according to the invention. Since the marks are very narrow in the circumferential direction, a minimum number of the pits will be degraded along the path that is followed by the reader. As a result the user of the optical information storage disk will not notice a degradation. The marks can be made in the prerecorded program area. Optionally the information can be placed in any part of the optical information storage area, in gaps provided in the prerecorded program area, at the beginning or end optical information storage area or in areas that contain prerecorded information.

In another aspect of the invention, an apparatus for forming a machine readable code on a prerecorded optical information storage disk is provided. The disk has a prerecorded program area. The apparatus includes a pulsed laser for selectively emitting a laser pulse at preselected pulsed intervals. Beam shaping optics are provided to shape the laser beam in a predetermined narrow beam width. The shaped beam is then directed along a preselected beam path so that it intersects with the optical information storage disk at a preselected location and removes the reflective metal coating. The disk is movable between a series of predetermined positions within the path of the pulsed laser so that upon each laser pulse emitted by the laser, a separate machine readable mark is made on the disks. A controller is provided to direct movement of the disk so a predetermined code is placed on the disk.

In another aspect of the invention an optical information storage disk is provided which includes machine readable marks located within a program area of the information storage disk. The machine readable marks are spaced circumferentially around the disk to form a machine readable code.

It is an object of an invention to provide a high speed method to serialize an optical information storage disk by using a laser.

It is another object of the invention to provide a high speed method to serialize digital video disks (DVD) by using a laser.

It is an object of the invention to put a large amount of machine readable information in the optical information storage area of the optical disk without materially degrading the prerecorded digital information supplied on the optical disk.

It is an object of the inventor to add machine readable code to prerecorded optical information storage disk which can be used to control access to the prerecorded information.

It is another object of the invention to provide an inspection method after a machine readable mark has been formed on the disk.

It is another object of the invention to provide a method for calibration of laser pulse focus on the metal layer of an information storage disk.

It is another object of the invention to provide a calibration method for eccentricity between prerecorded information tracks and machine readable code formed by pulsed laser.

Other and further objects will become apparent from the present specification.

The preferred embodiment of the present invention is illustrated in the drawings and description. However, it should be expressly understood that the present invention should not be limited solely to the illustrative embodiment.

DETAILED DESCRIPTION OF THE INVENTION

Figure 1:
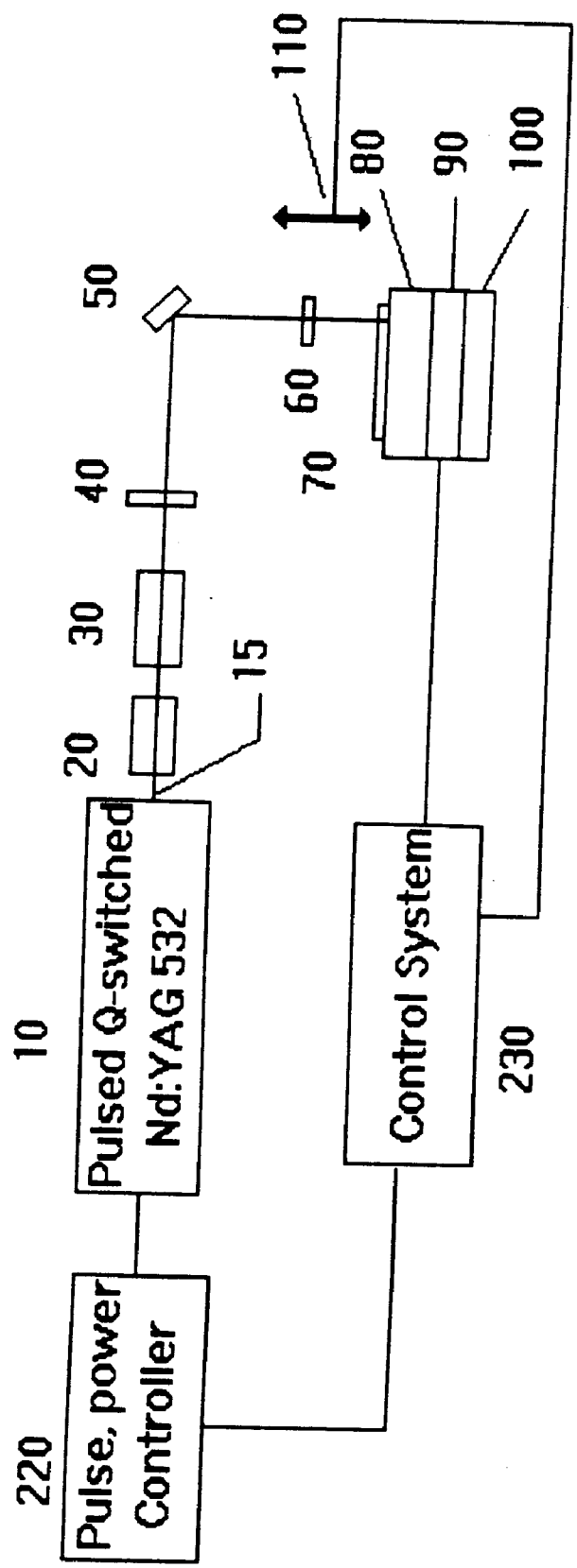
FIG. 1 is a schematic diagram of an apparatus for placing machine readable code on a DVD according to the invention.

The present invention provides an apparatus and method for adding machine readable code on a prerecorded optical information storage disk. Such code can be used to allow the addition of one or more security or access codes to the disks to allow selective access to all or a portion of the information contained on the disks.

According to the invention an apparatus for adding machine readable code on optical information storage disks is provided. A pulsed laser is provided to make a machine readable mark on the optical disk without substantially damaging the surrounding area of the disk. The pulse energy delivered by the laser to the optical disk is preselected depending on the optical disk. The power should be sufficient to penetrate the surface layer and to provide a machine readable mark on the metal layer of the disk but not so high as to unduly damage the surrounding portion of the disk. According to the invention, a laser pulse is directed along a predetermined path within the program area of the information storage disk to remove selective portions of the reflective aluminum layer. The pulsed laser is controlled to periodically deliver a laser pulse having a predetermined shape to mark the disk. A plurality of machine readable marks are formed by the laser corresponding to each laser pulse along a predetermined path. This predetermined path extends circumferentially around the disk to form a machine readable code. Preferably the machine readable code is formed by a series of spaced marks in one or more spaced circumferential tracks corresponding to the tracks of prerecorded information so that the same code reader used to detect the prerecorded information can be programmed to detect or read the machine readable code added according to the invention. According to the invention, it is possible to provide machine readable marks along large portions of the disk. As a result a large amount of machine readable information can be placed on the disk.

Generally in optical disks the prerecorded program information is supplied on radial spaced tracks having a preselected track separation distance between the tracks. According to the invention, the machine readable marks have a predetermined mark length in the radial direction. Preferably differences in concentricity between the prerecorded pits and the machine readable code are accounted for in determining the length of the machine readable mark. When the prerecorded information (the pits) are placed on a disk, each track of prerecorded information rotates about the same rotating axis. Due to tolerance variations, the rotation axis A of the tracks of pits does not necessarily correspond to the rotation axis B of the machine readable marks. The mark length is chosen to be equal or larger than the distance between axis A and axis B. In determining axis B, the eccentricity of rotary table, eccentricity of holding point between disk and rotary table should be accounted for. Alternatively as more fully described below, the rotating axis of the machine readable marks can be coordinated with that of the prerecorded information with a resulting shorter length machine readable mark being used.

The marks have a narrow width in the circumferential direction. The mark width needs to be large enough to be sensed by the reader and distinguished from the pits of prerecorded information, and narrow enough to avoid unnecessary degradation.

The resulting mark gives a much higher voltage reading from the reading sensor or program code reader than does the pits of prerecorded information. As a result the detector or machine reader can be programmed to have two modes of operation. The recorded mode where the machine reader is programmed to respond to the pits and ignore the high voltage producing marks and the supplemental mode where it detects the machine readable marks added according to the invention. Since the marks are very narrow in the circumferential direction, a minimum number of the pits will be degraded along the path that is followed by the reader. As a result the user of the optical information storage disk will not notice a material degradation.

The amount of energy delivered by the laser is predetermined depending on the type of optical disk involved and the size of the preselected mark. Digital Video Disks (DVD) are composed of an outside polycarbonate layer followed by a reflective aluminum layer followed by an optional lacquer layer followed by a reflective aluminum layer followed by a polycarbonate layer. Prerecorded information is stored in both polycarbonate layers. Preferably in a DVD disk, a mark will be made on one of the aluminum layers. Alternatively both layers can be marked.

As best seen in FIG. 1, an apparatus for providing machine readable marks on prerecorded optical disks preferably a DVD is provided. According to the invention a laser is provided which will deliver a laser pulse to mark a DVD disk. Preferable the laser beam will have a energy of 20 $\mu$j to 70 $\mu$j. As shown in FIG. 1, an Nd:YAG pulsed laser 10 having a wave length of approximately 532 nm is provided. Optionally other lasers and wave lengths can be used e.g. Nd:YLF. A laser pulse energy control 220 is provided to adjust the energy over small predetermined ranges. Depending on the pulse energy output of the laser, an energy attenuator 20 is provided. If the pulsed beam 15 exceeds the desire range, 20 to 70 $\mu$j for a DVD, an energy attenuator 20 is provided to reduce the laser pulse energy to the desired range. The laser pulse 15 is then directed to a beam expander preferably telescope 30 to expand the beam spot size of laser beam 15 from power attenuator 20. For example a 3× expander can be used.

Figure 5:
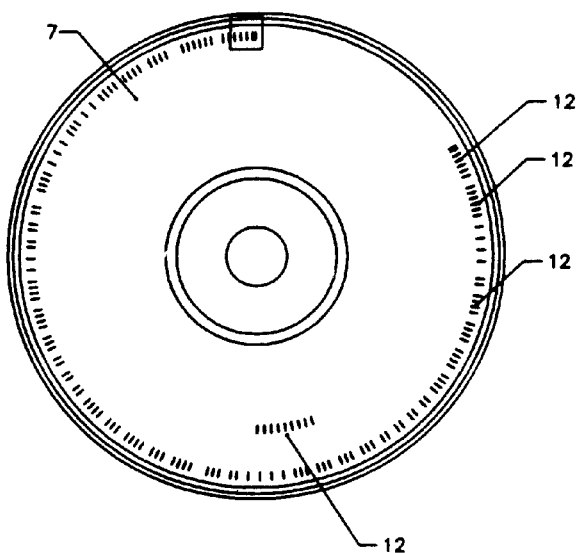
FIG. 5A is a schematic top view of a DVD according to the invention.
FIG. 5B is a partial sectional view of FIG. 5A.
FIG. 5C is a schematic top view of an alternative embodiment of a DVD according to the invention.
FIG. 5D is a partial sectional view of FIG. 5C.
Figure 5:
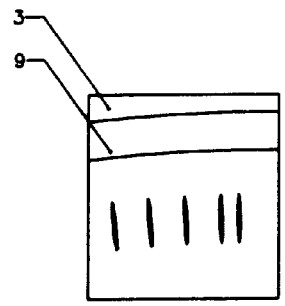
Figure 5:
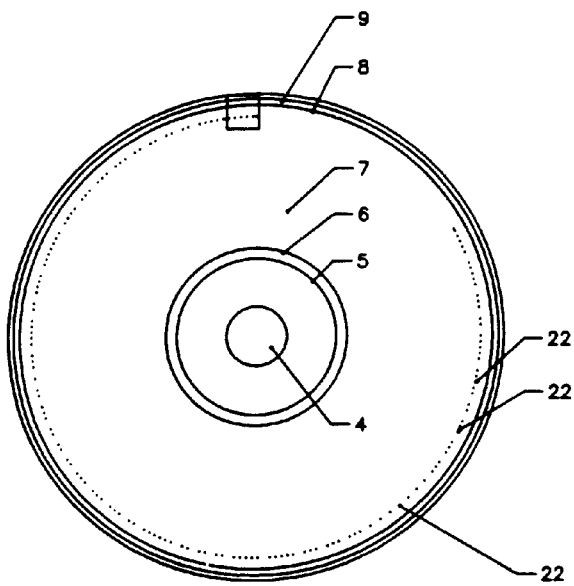
Figure 5:
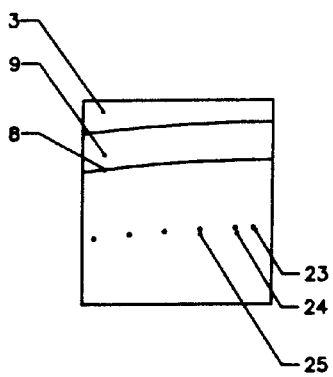

The expanded laser beam is directed through a beam shaping device preferably a cylindrical lens 40 desirably a convex lens having a preselected focal length depending on the mark shape and size to shape the beam to a preselected shape preferably an elliptical shape. For example for a mark having a elliptical shape and 300 μm in length, the lens 40 has a focal length 15 to 30 cm preferably about 20 to 25 cm. The beam is then directed to mirror 50 preferably a flat mirror where it is reflected and directed through beam shaping optics preferably cylindrical lens 60 to a final preselected location where it intersects with an optical storage disk preferably a digital video disk (DVD) 70. As best seen in FIGS. 5A and 5B, the desired machine readable mark 12 is then made on the disk. Cylindrical lens 60 controls the width of the mark. Preferably cylindrical lens 60 has a focal length of 2 to 10 cm preferably 2 to 6 cm which produces a mark width of 5 to 15 μm on the DVD 70.

A programmable rotary table 80 is preferably provided for example AEROTECH, Pittsburgh, Pa., Model ADR 150-2. Preferably an x translation stage 90 is provided for movement of the table 80 along the x axis. Preferably a y translation stage 100 is provided for movement of the table 80 in along the y axis. Suitable for use as the x and y translation stages is AEROTECH Pittsburgh, Pa., Model ATS 15010. Preferably a z translation stage is provided to adjust the distance between the DVD 70 and lens 60. Examples of suitable z stages are Edmund Scientific, Barrington, N.J., Model A37603 and AEROTECH, Pittsburgh, Pa., Model ATS15015. According to the invention, either the table 80 can be moved vertically or the lens 60 can be moved. Desirably z translation stage 110 for movement of lens 60 vertically relative to rotary table 80 is provided. Control computer 230 is provided and is programmed to control the pulsing of laser 10 and the movement of the rotary table 80 and x,y and z translation stages 90, 100 and 110 so that the marks are made on the disk at the preselected locations.

In operation the computer 230 is preprogrammed to move the disk 70 by rotating the table 80 upon each laser pulse from pulsed laser 10 to form a machine readable code. As a result a predetermined pattern is marked on disk 70 which can be machine readable. The mark width needs to be large enough to be sensed and distinguished from the prerecorded pits by the reader but not so large to materially degrade the program information. Preferably the mark has a width of 3 μm to 25 μm.

The machine readable marks 12 corresponds to the spot size image of the pulsed laser 10 when it contacts disk 70. The spot size should be about 1 μm in width or greater for a DVD. Preferable the spot size width should be about 5 to 30 μm more preferably about 5 to 15 μm and desirably about 5 to 10 μm.

The length of the mark in the radial direction is also determined by the beam shaping optics. The mark length is preselected to be larger than the distance between the tracks of the prerecorded information and larger than the concentricity tolerance as described above. The mark length should be long enough that it will be scanned by the reader when it is scanning the pits along tracks despite possible differences in concentricity axises. The machine readable marks 12 corresponds to the spot size image of the pulsed laser 10 at the point it contact the disk. Desirably the mark has a length in the radial direction of about 75 to 700 μm, preferably about 200 to 300 μm for example about 300 μm. As best seen in FIG. 5A and 5B the resulting mark 12 desirably is substantially linearly shaped which will allow the same sensor that tracks the pits, track the machine readable code according to the invention. The mark length is generally selected in view of the specific type of storage disk and information reader.

Figure 3:
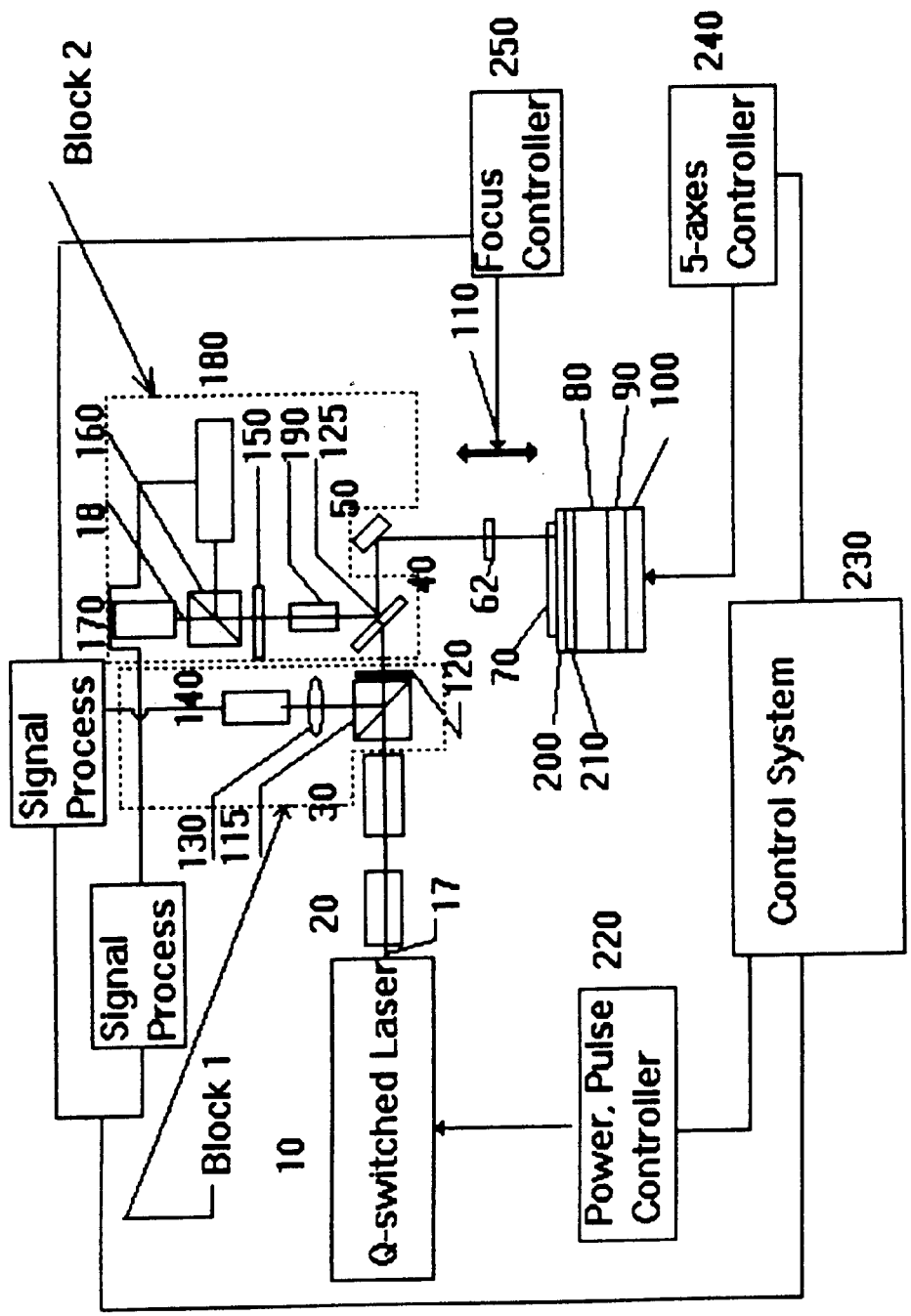
FIG. 3 is a schematic diagram of an alternative embodiment for placing machine readable code on a DVD according to the invention.

In the embodiment of FIG. 3, the length of the mark in the radial direction can be substantially reduced when the rotating axises of the pits and machine readable code are coordinated. In such a case, a mark having a length of about 5 to 30 μm, preferably about 5 to 15 and desirably about 5 to 10 μm can be used. The mark width would be within the same ranges as the length. Optionally a circular mark can be used. The circular mark would desirably have a diameter of about 5 to 30 μm preferably about 5 to 15 μm and more preferably about 5 to 10 μm. See FIGS. 5C and 5D.

If the rotating axises are not coordinated, the mark should be long enough to overcome any difference. Since the machine readable marks have a substantially different scanned voltage than do the pits, the digital sensor reading the optical information storage disk can be programmed to ignore the machine readable marks or ignore the pits.

Preferably according to the invention, as best seen in FIG. 5A, two or more, preferably a series of predetermined marks 12 are applied to the DVD circumferentially about the disk. Desirable the marks can be in the form of one or more spaced circumferential tracks.

Figure 2:
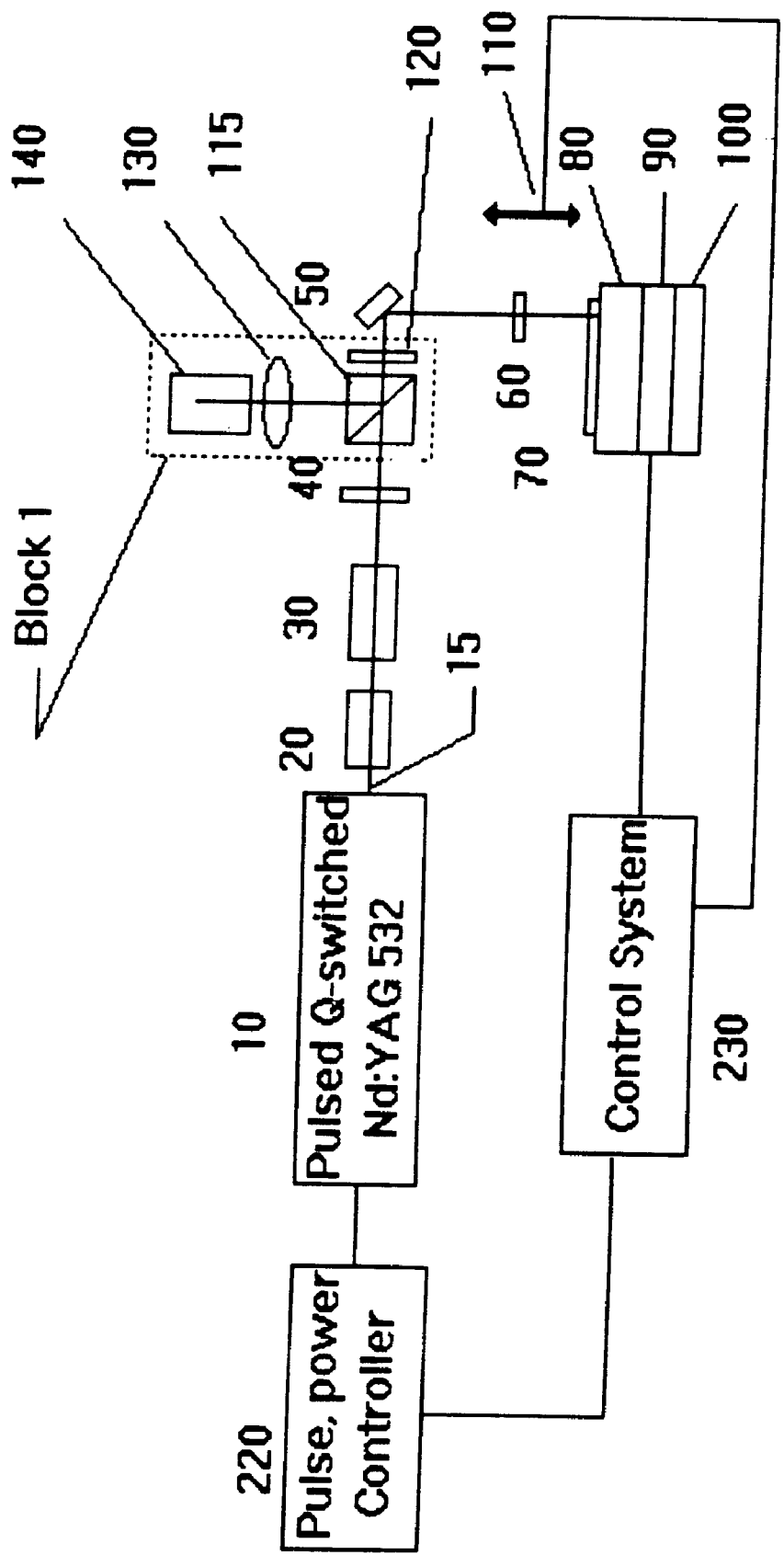
FIG. 2 is a schematic diagram of an alternative embodiment for placing machine readable code on a DVD according to the invention.

Referring to FIG. 2, an alternative embodiment for forming machine readable code on optical information storage disks according to the invention is shown. As shown in FIG. 2, a set up control mechanism to determine whether a mark has been successfully placed on the DVD 70 or other optical disk and to activate the z translation stage is provided. See block 1 on FIG. 2. The set up mechanism generally includes photon detector 140, optical focusing lens 130, polarizing beam splitter 115 and quarter wave plate 120. Between cylindrical lens 40 and high reflective mirror 50, a polarizing beam splitter 115 is provided. Between polarizing beam splitter 115 and mirror 50, quarter wave plate 120 is mounted in the path of laser beam 15. The polarized beam splitter 115 transmits horizontally polarized laser beams to quarter wave plate 120 and reflects vertically polarized laser beams through focusing lens 130 to photon detector 140. Quarter wave plate 120 changes the polarization of the laser beam propagating through it from left to right from linearly polarized to circularly polarized.

In operation a horizontal polarized laser beam 15 is transmitted from laser 10 and travels through energy attenuator 20, telescopic beam expander 30 and through beam shaping optics (cylindrical lens 40) to polarizing beam splitter 115. Horizontally polarized laser pulse is transmitted through polarizing beam splitter 115 to quarter wave plate 120 where the polarization of the beam 15 is changed to circular polarization. The beam is then reflected by high reflecting mirror 50 through cylindrical lens 60 to the DVD 70. In the event that the focal point of lens 60 does not intersect the metal (aluminum) layer in the disk, it will not mark the disk and will be reflected by the aluminum layer of the DVD 70. The reflected beam travels back through cylindrical lens 60 and is reflected by mirror 50 through quarter wave plate 120 at which point the polarization will be changed to vertical. The vertically polarized beam then will be reflected by polarizing beam splitter 115 through lens 130 to photon detector 140. A signal will be then detected. The detected signal level varies from relatively high level to very low signal abruptly as Z stage moves the focus point from out of focus to the focus point on to the aluminum layer of the disk. The Z stage stops moving as soon as that very low signal is detected by the photon detector 140. By slightly adjusting pulse energy with the range a, very good mark without damage to surrounding program area is achieved. This process will be repeated when the type of optical disk for marking is changed.

As best seen in FIG. 3, in another aspect in the invention, an apparatus for providing machine readable code to prerecorded optical disks, particularly DVD disk 70, having a system for coordinating the axis of rotation of the prerecorded information tracks with axis of rotation of the machine readable marks and for quality assurance is provided. Referring to FIG. 3 a Q switched pulsed laser 10 is provided. The laser pulse is preferably directed to an energy attenuator 20 wherein the energy of the pulsed laser 10 is reduced to between 0.4 µj to 10 µj. The laser is desirably an Nd:YAG laser having an wave length of approximately 532 nm or 1064 nm. Preferably the laser pulse 17 leaving attenuator 20 is directed to a telescope beam expander 30. The laser pulse 17 is then directed to a polarizing beam splitter 115 and a quarter wave plate 120. The polarizing beam splitter 115 transmits horizontally polarized laser beams and reflects vertically polarized laser beams. Laser beam 17 which is horizontally polarized as it leaves the Q switched laser is then transmitted through quarter wave plate 120 wherein it become circularly polarized. A dichroic mirror 125 is provided. Mirror 125 transmits beams having a wave length of approximately 532 nm, that is the wave length of the Q switch laser 10 and reflects beams of another preselected wave length here a wave length of 632 nm. The beam 17 is transmitted through dichroic mirror 125 where it is directed to high reflecting mirror 50 where it is reflected through beam shaping optics preferably a spherical lens 62 or optionally a cylindrical lens. As seen in FIG. 5C, when a spherical lens is used, the resulting laser beam will be generally circular in shape and will make a generally circular mark 22 on DVD 70.

Rotary table 80 is provided. Preferably a x axis translation stage 90 and a y axis translation stage 100 are provided in association with the rotary table 80. Optionally a first short travel x translation stage 200 and a second short travel y translation stage 210 are provided for adjusting the position of the DVD a small amount relative to the rotary table for concentricity calibration. For example Newport Corp., Irvine, Calif., Model MFN 08PP is suitable as x and y short translation stages. The x short travel translation stage and the y short travel translation stage preferably both have a 500 µm travel range. A z axis translation stage 110 which acts as a focus controller for lens 62 is provided. Movement of lens 62 in relation to the DVD controls the focus point of the laser pulse in relation to the DVD to form a mark thereon as described regarding FIG. 2.

A preprogrammed control system 230 for example AEROTECH, Pittsburgh, Pa. Unidex (TM) 600 machine controller system is provided for controlling components of the system. The control system is preprogrammed with the locations of the various machine readable code that is required to be added to DVD. The rotary table 80 is rotated so that a plurality of circumferential marks are made on the disk 70. The pulsed beam 17 desirably marks the DVD 70 with the machine readable code.

It is preferred that the rotating axis of the prerecorded information (the pits) and the machine readable marks according to the invention are the same. Referring to FIG. 5C, DVD 70 includes an outside peripheral area 9 which is devoid of prerecorded program information. The outside track of program information has a boundry 8. Peripheral area 9 includes a reflective aluminum mirror area which contains no program information (devoid of pits) which borders on outside boundary 8. At the outer periphery of the disk 70, there is a non-reflective area 3. The DVD 70 has a central hole 4 and an adjoining non reflective area 5. Adjacent to the nonreflective area is reflective area 6 which does not contain any program information. According to the invention, the location of the outside boundry of a track of prerecorded information is determined and consequently the axis of rotation of the prerecorded information.

As seen in the block 2 in FIG. 3, according to the invention, a low power continuous wave laser 170 emits a laser beam 18 of a different wave length than that of the pulsed laser 10. For example a continuous wave laser 170 having a wave length of 632 nm is provided. The laser beam 18 from 170 is emitted as a horizontally polarized beam which passes through polarizing beam splitter 160 and quarter wave plate 150 which converts the polarization of beam 18 to circular polarization. The circular polarized beam 18 is then optionally directed through telescope 190 to dichroic mirror 125. Mirror 125 will reflect beams having the wave length emitted by laser 170 to mirror 50 where it is then reflected through lens 62. Mirror 50 is desirably a dual wave length high reflective mirror for laser 170 and laser 10. The telescope 190 and lens 62 focus the beam. The disk 70 will be moved by x stage 90 and y stage 100 to place a preselected point on the disk in communication with laser beam 18. Such point is selected at the approximate location of the mirror/program boundry for the DVD. For a typical DVD, this boundry is about 6 cm for the center of the disk. The determination of the precise location of the mirror/program boundry is then determined as described below. The beam 18 reflects back from the disk surface through lens 62, mirror 50, dichroic mirror 125, telescope 190 and quarter waveplate 150. After beam 18 exits from waveplate 150, beam 18's polarization is changed to vertical polarized and is reflected from the polarizing beam splitter to photon detector 180, which senses the intensity of reflected beam 18.

The intensity of reflection is different from different areas in the disk. For example, reflection from the mirror area 9 is higher than from program area 7, and reflection is higher from program area 7 than no metal coating area 3. The reflection intensity from the program/mirror boundry 8 is in between the reflection intensity from the mirror area 9 and the program area 7. A range of approximate intensities for the program area 7, the mirror area 9 and the boundry area 8 are inputed into control system 230. The intensity of reflection of the disk is measured during the rotation of the disk and compared to the inputed intensities by computer 230. The position of the disk is then adjusted by moving the short travel stages 200 and 210 an until a uniform intensity is detected within the inputed intensity range of the boundry area 8. The computer controls x-y short travel stages 200 and 210 to move the disk according that signal variation. The resulting effect will be that program/mirror border can be located by locating the points where the reflection intensity corresponds is the preselected value for the boundry. Hence the rotating axis of the prerecorded information tracks can be located. After the concentricity calibration, computer control system 230 directs x-y stages 90 and 100 to move the disk to where machine readable mark are required using the same axis of rotation that was used for the prerecorded information.

As also illustrated in the block 2 in the FIG. 3, desirably disk marking quality control can be provided by block 2. Laser beam 18 substantially coincides with the laser pulse 17. Both laser beam 18 and laser pulse 17 are focused on the aluminum layer of the DVD with the spot size of beam 18 slightly larger than that of laser pulse 17. When the laser beam 18 is reflected by a no marking area on the disk, the reflection intensity detected from the photon detector 180 is the highest. When the laser beam 18 scans a marked location, the reflection intensity detected from the photon detect 180 is substantially lower. By defining the reflecting intensity range reflected from a good mark, a bad mark can be detected from substantial intensity variation from the photon detector. Thus, the beam 18 is reflected by the aluminum layer on disk 70 through lens 62 to mirror 50 where it is reflected back to dichroic mirror 125 which will reflect the beams of such a wave length through telescope 190 and quarter waveplate 150 which will change the polarization of the beam 18 to vertical polarization. The beam then will be reflected by polarizing beam splitter 160 which will reflect vertically polarized beams to photon detector 180 where the intensity of reflection will be measured. When the intensity is outside the predetermined range for a good mark, a signal that a defectively marked disk has been encountered will be given. As a result, be the defective disks will be removed.

A control system preferably programmed computer 230 is provided for controlling the various components of the apparatus according to the invention. Thus, the timing of the periodic laser pulsing is controlled and coordinated with the movement of rotary table 80 preferably by directing the operation of 5—axis controller 240.

Optionally a separate focus control 250 is provided for responding to signals received from photon detector 140 and optionally from the photon detector 180.

Desirably the marks at the beginning and end of the machine readable code which is added to the optical disks are distinguishable from the rest of the machine readable code. For example the separation between the first and last mark and the remaining code can be greater that the separation between other code marks. As a result, the reader will be able to locate the beginning and of the machine readable code. As seen in FIG. 5D, first or last mark 23 is spaced closer to intermediate mark 24 than is mark 24 spaced from intermediate mark 25.

Figure 4:
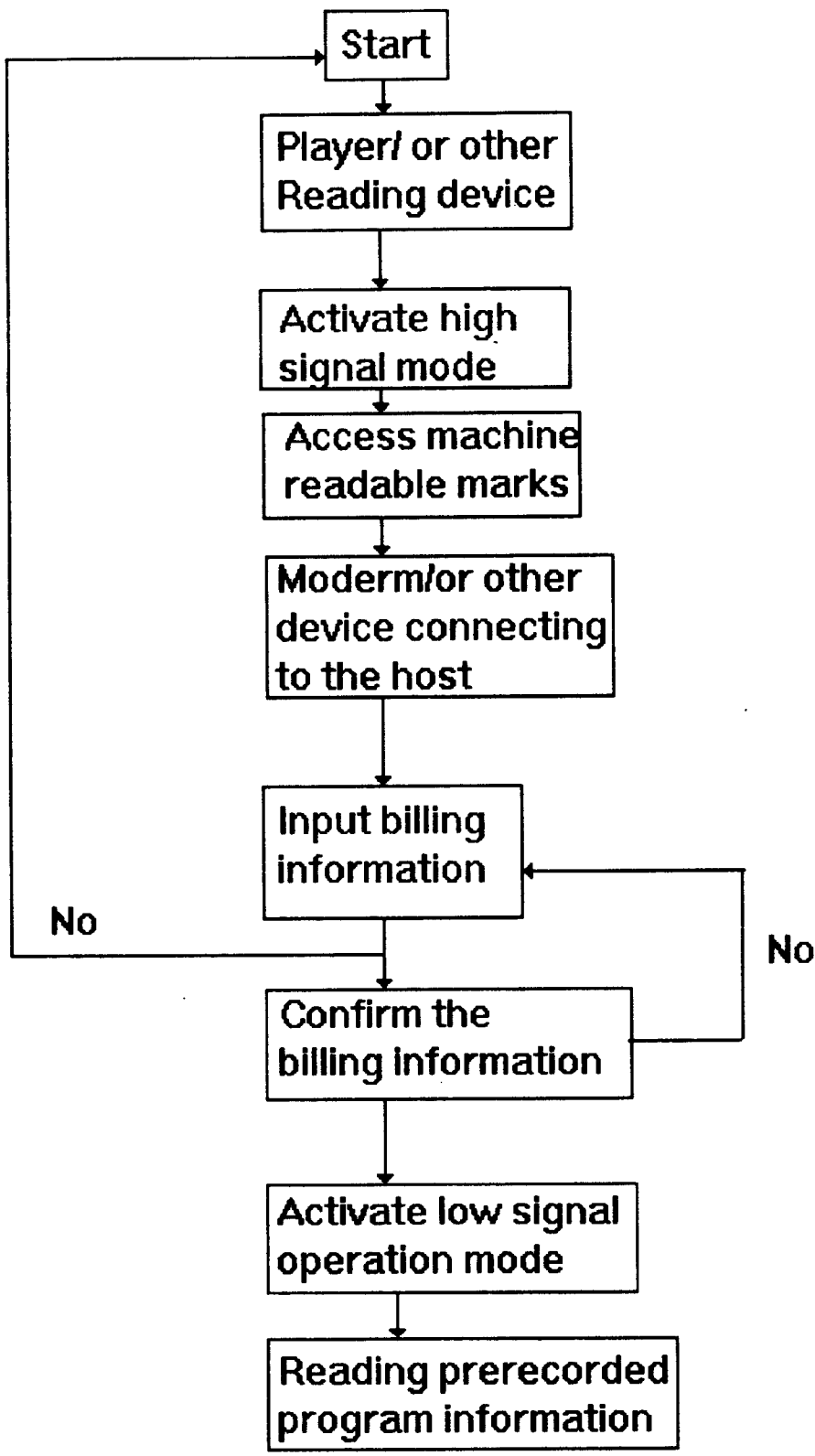
FIG. 4 is a flow chart showing the operation of the code reader according to the invention.

Referring to FIG. 4 which is a flow chart showing the operation of code reader 29, the code reader is programmed to have a loop. The reader is started and the high voltage signal mode is activated. The reader will then access the machine readable marks. Alternately a modem or other device connected to an outside host or signaling source is provided. This host will determine whether use is authorized for example by signaling billing information. Providing such billing information is received, a signal will be given to optionally confirm the billing information and then to activate the low voltage operation mode in which the prerecorded information will then be accessed by the reader. If no billing information is received then the player or other reading device will recycle to the start position.

The foregoing is considered as illustrative only to the principles of the invention. Further, since numerous changes and modifications will occur to those skilled in the art, it is not desired to limit the invention to the exact construction and operation shown and described above, and accordingly all suitable modification and equivalents may be resorted to, falling within the scope of the invention.

I claim:

1. A method of forming machine readable code on an optical information storage disk, said method comprising;

periodically directing a laser pulse along a predetermined path on said disk, said laser pulse having a selected spot size;

selectively forming a plurality of machine readable marks corresponding to said laser pulses along said predetermined path;

said predetermined path extending circumferentially around the disk to form a machine readable code; and said machine readable code comprising a plurality of said marks separated from each other along said circumferential path;

said disk having a program area; said program area including program information on radial spaced tracks having a preselected track separation distance between said tracks;

said machine readable marks having a predetermined mark length in the radial direction; said mark length being greater than the track separation distance.

2. The method according to claim 1 wherein said laser pulse is supplied by a Q-switched laser.

3. A method according to claim 1 further comprising said program information radial spaced tracks having an axis of rotation a; said machine readable code having an axis of rotation b; said mark length further being greater than the distance between axis a and axis b.

4. A method according to claim 1 further comprising said disk is a DVD; said mark having a predetermined mark width in a circumferential direction of about 3 to 25 $\mu$m.

5. A method according to claim 4 wherein said mark width is about 5 to 15 $\mu$m.

6. A method of forming machine readable code on an optical disk comprising:

periodically pulsing a laser along a path;

directing said laser pulse to a preselected point;

adjusting said laser pulse to a preselected spot size having a preselected spot width and preselected spot length at said preselected point;

placing an optical disk having a prerecorded program area in the path of said laser pulse at said preselected point;

selectively moving said optical disk relative to said laser upon each pulse of said laser so that a machine readable mark is made at a different preselected disk location in the program area of said optical disk upon each laser pulse to form a preselected machine readable code.

7. The method of forming machine readable code according to claim 6 wherein said optical disk is moved circumferentially upon each pulsing of the laser so that said machine readable code is formed on a circumferential track.

8. The method according to claim 7 wherein said prerecorded program area includes prerecorded information on spaced tracks having a prerecorded information axis of rotation; said machine readable code having the same axis of rotation as said prerecorded information axis of rotation.

9. A method according to claim 7 or 8 wherein said optical disk is a DVD.

10. A method according to claim 7 wherein said spot width is about 5 to 15 $\mu$m.

11. A method according to claim 7 wherein said spot length is about 75 $\mu$m to 700 $\mu$m.

12. A method according to claim 1 wherein said spot length is about 200 $\mu$m to 300 $\mu$m.

13. A method according to claim 12 wherein said spot length is about 300 $\mu$m.

* * * * *